US009617433B2

(12) United States Patent
Sababi et al.

(10) Patent No.: US 9,617,433 B2
(45) Date of Patent: Apr. 11, 2017

(54) CORROSION INHIBITING COATING BASED ON CERIUM OXIDE AND A CATECHOLIC POLYMER

(75) Inventors: Majid Sababi, Solna (SE); Fan Zhang, Täby (SE); Pan Jinshan, Solna (SE); Per Claesson, Sundbyberg (SE); Andra Dedinaité, Sundbyberg (SE); Olga Krivosheeva, Solna (SE)

(73) Assignee: BIOPOLYMER TECHNOLOGY OF SWEDEN AB, Molnlycke (SE)

( * ) Notice: Subject to any disclaimer, the term of this patent is extended or adjusted under 35 U.S.C. 154(b) by 550 days.

(21) Appl. No.: 13/810,379

(22) PCT Filed: May 2, 2011

(86) PCT No.: PCT/EP2011/056940
§ 371 (c)(1),
(2), (4) Date: Mar. 29, 2013

(87) PCT Pub. No.: WO2012/007199
PCT Pub. Date: Jan. 19, 2012

(65) Prior Publication Data
US 2013/0183452 A1    Jul. 18, 2013

Related U.S. Application Data

(60) Provisional application No. 61/365,487, filed on Jul. 19, 2010.

(30) Foreign Application Priority Data

Jul. 16, 2010  (SE) ...................................... 1050806

(51) Int. Cl.
| C09D 5/08 | (2006.01) |
| C09D 5/10 | (2006.01) |
| B05D 1/18 | (2006.01) |
| B05D 5/00 | (2006.01) |
| B05D 7/14 | (2006.01) |
| C09D 7/12 | (2006.01) |
| C09D 189/00 | (2006.01) |
| C23F 11/173 | (2006.01) |
| C23F 11/18 | (2006.01) |
| B05D 1/02 | (2006.01) |
| B05D 7/00 | (2006.01) |
| C08K 3/22 | (2006.01) |

(52) U.S. Cl.
CPC ................. *C09D 5/10* (2013.01); *B05D 1/18* (2013.01); *B05D 5/00* (2013.01); *B05D 7/14* (2013.01); *C09D 5/082* (2013.01); *C09D 7/1258* (2013.01); *C09D 189/00* (2013.01); *C23F 11/173* (2013.01); *C23F 11/185* (2013.01); *B05D 1/02* (2013.01); *B05D 7/58* (2013.01); *C08K 3/22* (2013.01); *C08K 2003/2213* (2013.01)

(58) Field of Classification Search
CPC .................................. C09D 5/082; C09D 5/10
See application file for complete search history.

(56) References Cited

U.S. PATENT DOCUMENTS

| 2,763,569 A * | 9/1956 | Bradstreet et al. ........... 427/314 |
| 4,585,585 A | 4/1986 | Waite |
| 5,015,677 A | 5/1991 | Benedict et al. |
| 5,733,361 A * | 3/1998 | Chane-Ching et al. ... 106/14.21 |
| 5,922,330 A * | 7/1999 | Chane-Ching et al. ...... 424/401 |
| 6,190,780 B1 | 2/2001 | Shoji et al. |
| 6,368,586 B1 * | 4/2002 | Jacob et al. ............... 424/78.08 |
| 8,673,286 B2 * | 3/2014 | Messersmith et al. .... 424/78.27 |
| 8,883,519 B1 * | 11/2014 | Perez et al. ................... 436/525 |
| 2004/0020568 A1 * | 2/2004 | Phelps et al. ................. 148/273 |
| 2004/0028820 A1 | 2/2004 | Stoffer et al. |
| 2004/0104377 A1 * | 6/2004 | Phelps et al. ................. 252/387 |
| 2008/0015138 A1 * | 1/2008 | Hamilton et al. ................ 514/2 |
| 2008/0247984 A1 * | 10/2008 | Messersmith et al. .... 424/78.02 |
| 2008/0260824 A1 * | 10/2008 | Nangia et al. ................. 424/468 |
| 2008/0299059 A1 * | 12/2008 | Quadir ............................ 424/61 |
| 2009/0151600 A1 * | 6/2009 | Cha et al. .................. 106/135.1 |
| 2009/0203883 A1 * | 8/2009 | Cha et al. ..................... 530/350 |
| 2009/0228115 A1 | 9/2009 | Liu et al. |
| 2009/0289217 A1 * | 11/2009 | Sato et al. ................... 252/79.4 |
| 2010/0226855 A1 * | 9/2010 | Nangia et al. ................ 424/9.1 |

(Continued)

FOREIGN PATENT DOCUMENTS

| CN | 101658837 A1 | 3/2010 |
| WO | 03/008376 A1 | 1/2003 |
| WO | 03/080137 A1 | 10/2003 |

OTHER PUBLICATIONS

Hansen et al, "The inhibition of corrosion of S30403 stainless steel by a naturally occurring catecholic polymer", Corrosion Science, 37(9):1423-1441 (1995).

*Primary Examiner* — Liam J Heincer
(74) *Attorney, Agent, or Firm* — Porter Wright Morris & Arthur LLP

(57) ABSTRACT

A corrosion inhibiting coating for metal objects as well as a method for applying a coating is described. Said coating comprising at least one cerium oxide and at least one polymer. The polymer comprises at least one cathecholic component covalently bound thereto, and the at least one polymer displays a net positive charge at a pH of 7. The material inventive coating is environmental friendly and does not display serious health risks. Further an excellent corrosion inhibition is obtained for metals, even for carbon steel. The corrosion the properties of a coated surface is comparable with those of stainless steel.

17 Claims, 14 Drawing Sheets

(56) References Cited

U.S. PATENT DOCUMENTS

2011/0052788 A1    3/2011  Messersmith et al.
2011/0086095 A1*  4/2011  Jacob et al. .................. 424/463
2012/0003888 A1*  1/2012  Lee et al. .......................... 442/1

* cited by examiner

CORROSION INHIBITING COATING BASED ON CERIUM OXIDE AND A CATECHOLIC POLYMER

TECHNICAL FIELD

The present invention relates generally to an environmentally friendly coating for the prevention of corrosion of metals as well as a method for applying the coating.

BACKGROUND

It is known that cerium oxide treatment of a metal improves the corrosion resistance due to the formation of a protective oxide film which acts as an active protective layer on the metal surface.

Adhikari et al in Electrochimica Acta, Vol 53, issue 12, pp 4239-4247 studies anticorrosion properties of a coating comprising modified polyaniline dispersed in polyvinylacetate on carbon steel.

Zhitomirsky in Surface Engineering, Vol 20, issue 1, pp. 43-47 discloses electrodeposition of films comprising ceria and the cationic polymer polyethylenimine.

Corrosion inhibiting coatings according to the state of the art often use compounds which are known to cause environmental problems and/or health problems for users. Examples include chromium compounds.

Y. Gao et al in Transactions of the Institute of Metal Finishing vol 84, no 3, 2006, pp 141-148 discloses corrosion protection of zinc electroplated steel. The corrosion inhibiting coating is a coating comprising either gelatine or albumin as well as dichromate. Also an alternative coating comprising gelatin and cerium trichloride is disclosed. It is concluded that the ability of cerium trichloride to stabilize protein formulations against putrefaction is questionable and that its adoption would require an associated stabilizer.

U.S. 2004/0028820 discloses coating of aluminum using cerium ions in the presence of an oxidizing agent. The preferred cerium-based coatings comprise cerium oxide, hydrated cerium oxide, or forms of cerium hydroxide after coating. The coating bath optionally contains animal gelatin, glycerol, or other organic additive to improve coating uniformity and corrosion resistance. It is speculated that the gelatin functions to modify the nucleation and growth sites.

Mussel adhesive protein (MAP) is formed in a gland in the foot of byssus forming mussels, such as the common blue mussel (*Mytilus edulis*). U.S. Pat. No. 5,015,677 as well as U.S. Pat. No. 4,585,585 disclose that MAP has very strong adhesive properties after oxidation and polymerization, e.g. by the activity of the enzyme tyrosinase, or after treatment with bifunctional reagents.

J. H. Waite et al in The Journal of Adhesion, vol. 81, 2005, pp 297-317 reviews adhesive proteins from mussels.

Lee et al in Science, vol 318, 2007, pp 426-430 discloses dopamine self-polymerization to form thin, surface-adherent polydopamine films onto a wide range of inorganic and organic materials, including noble metals, oxides, polymers, semiconductors, and ceramics.

WO 03/008376 discloses conjugation of DOPA moieties to various polymeric systems.

A. Statz et al in Biofouling, vol 22, no 6, 2006, pp 391-399 concerns marine antifouling and fouling-release performance of titanium surfaces coated with a polymer consisted of methoxy-terminated poly(ethylene glycol) conjugated to the adhesive amino acid DOPA and was chosen based on its successful resistance to protein and mammalian cell fouling. It is concluded that this polymer may be effective in marine antifouling and fouling-release applications.

CN 101658837 discloses preparation of an anticorrosive film for metal surfaces. The film comprises dopamine.

WO 03/080137 discloses a method for attaching two surfaces using a protein and periodate ions.

In the prior art there is still a need for an improved corrosion protection.

SUMMARY

It is an object of the present invention to alleviate at least some of the disadvantages of the prior art and to provide an improved coating for at least partially preventing corrosion of metals.

In a first aspect there is provided a coating for metal objects, said coating comprising at least one cerium oxide and at least one polymer, wherein the at least one polymer comprises at least one catecholic component covalently bound thereto, and wherein the at least one polymer displays a net positive charge at a pH of 7.

In a second aspect there is provided a method for coating a metal object, said method comprising the step of applying at least one cerium oxide and at least one polymer, wherein the at least one polymer comprises at least one catecholic component covalently bound thereto, and wherein the at least one polymer displays a net positive charge at a pH of 7.

Further aspects and embodiments are described in the appended claims.

Advantages of the invention include that the material is environmental friendly and does not display the serious health risks as the compounds according to the state of the art. Further an excellent corrosion inhibition is obtained. Moreover only small amounts of coating material is required.

The combination between the polymer and small particles comprising cerium oxide gives the excellent corrosion protection.

The polymer displays a strong binding to the surface. The combination of materials, i.e. the polymer and small particles of cerium oxide is favorable since the small particles and the MAP protein form a compact composite film. Thus there is a synergistic effect of cerium oxide and the polymer.

A further advantage is that the composite film grows together with the corrosion product, as evidenced by the increase in the protection efficiency with time.

The corrosion inhibiting properties are excellent for many metals and even for carbon steel.

There is further the advantage that it is possible to build up thicker films for instance by several depositions of the polymer and the small particles.

BRIEF DESCRIPTION OF THE DRAWINGS

The invention is described with reference to the following drawings in which.

DETAILED DESCRIPTION

Figure 1:
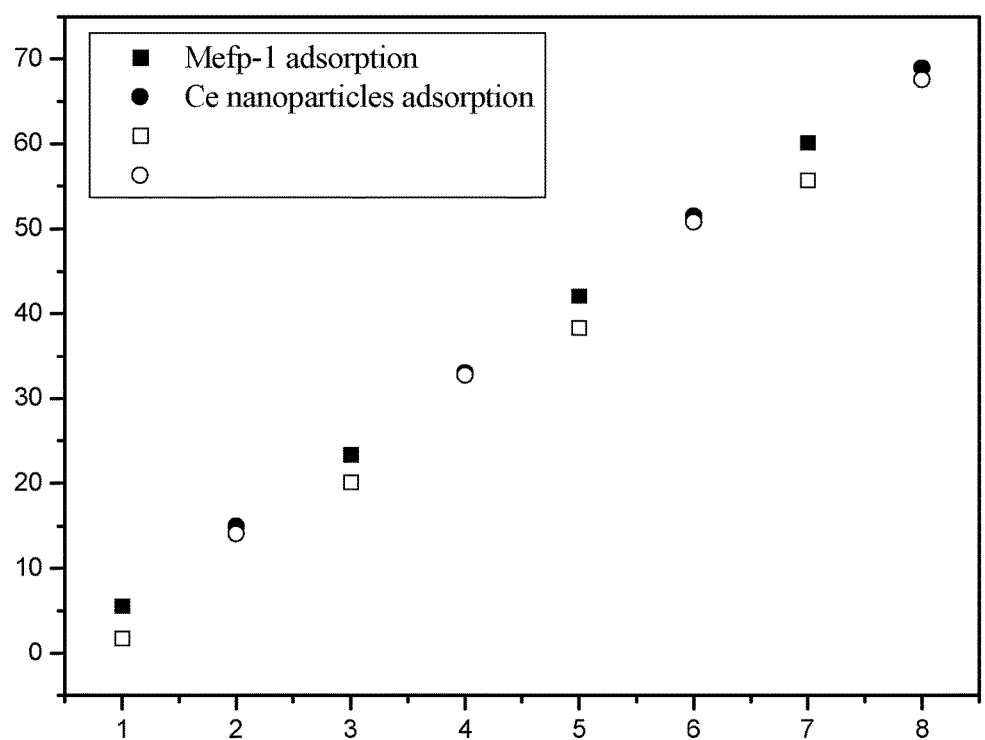
FIG. 1 shows the sensed mass as a function of deposition number during alternative adsorption of MAP (filled squares) and ceria nanoparticles (filled circles) and after rinsing with water after the MAP (empty squares) and ceria nanoparticle (empty circles) deposition steps.

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

The term "about" as used in connection with a numerical value throughout the description and the claims denotes an interval of accuracy, familiar and acceptable to a person skilled in the art. Said interval is ±20%.

As used throughout the claims and the description, the term "metal object" denotes an object comprising at least partially a metal surface. An object made of a metal and a non-metal where a part of the surface is a metal surface is thus encompassed within the term metal object. Further objects at least partially made of different metals as well as metal alloys are encompassed within the term.

As used throughout the claims and the description, the term "coating" denotes a covering that is applied at least partially to the surface of an object.

As used throughout the claims and the description, the term "polypeptide" denotes polymers formed of amino acid residues. Proteins are encompassed within the term polypeptide. Polypeptides comprising 50 or more amino acid residues are also denoted proteins.

As used throughout the claims and the description, the term "cerium oxide" denotes a chemical compound or complex comprising the chemical element cerium (Ce) and the chemical element oxygen (O). The term "cerium oxide" denotes oxides of cerium including $Ce_2O_3$ and $CeO_2$. The terms ceric oxide, ceria, cerium(III) oxide, cerium(IV) oxide and cerium dioxide are also encompassed by the term cerium oxide.

As used throughout the claims and the description, the term "marine organism" denotes water living organisms.

As used throughout the claims and the description, the term "mollusc" denotes the phylum mollusca of invertebrate marine animals.

As used throughout the claims and the description, the term "mussel" denotes several families of the bivalvia molluscs including the family mytilidae.

As used throughout the claims and the description, the term "byssus forming mussels" denotes bivalvia molluscs forming byssus.

As used throughout the claims and the description, the term "carbon steel" denotes alloys comprising more than 50 wt % iron and with a carbon content of less than 2 wt %. Steel is considered to be carbon steel when no minimum content is specified or required for chromium, cobalt, molybdenum, nickel, titanium, tungsten, vanadium and zirconium or any other element to be added to obtain a desired alloying effect.

In a first aspect there is provided a coating for metal objects, said coating comprising at least one cerium oxide and at least one polymer, wherein the at least one polymer comprises at least one catecholic component covalently bound thereto, and wherein the at least one polymer displays a net positive charge at a pH of 7.

The net charge of the polymer often varies with the pH depending on the nature of the polymer. For groups of the polymer may have a charge which varies with the pH. The pH of the polymer is positive at the application of the polymer. At pH 7 there may be both positive and negative charges on the polymer, but the net charge of a polymer is positive.

In one embodiment the at least one cerium oxide is $CeO_2$ (ceria). In one embodiment the at least one cerium oxide is in the form of particles. In one embodiment the at least one cerium oxide is in the form of particles with a diameter of 1-1000 nm. It is an advantage to use particles with relatively small diameter. Examples of further size intervals for the particles include but are not limited to 4-80 nm, 4-40 nm, 5-50 nm, and 5-100 nm. Without wishing to be bound by any particular scientific theory the inventors believe that the particles of cerium oxide and the polymer form a composite layer and a dense coating with suitable properties.

In one embodiment the at least one cathecholic component is at least one selected from DOPA (L-3,4-dihydroxyphenylalanine), and a DOPA-derivative.

In one embodiment the at least one polymer comprises at least 2 wt % based on the molecular weight Mw of at least one moiety selected from DOPA (L-3,4-dihydroxyphenylalanine), and a DOPA-derivative. In one embodiment the at least one polymer comprises at least 5 wt % based on the molecular weight Mw of at least one moiety selected from DOPA (L-3,4-dihydroxyphenylalanine), and a DOPA-derivative. In another embodiment 6-30 wt % of the polymer based on the molecular weight Mw are at least one moiety selected from DOPA (L-3,4-dihydroxyphenylalanine), and a DOPA-derivative.

In one embodiment the at least one polymer is at least one polypeptide extracted from a byssus-forming mussel. In one embodiment the at least one polypeptide comprises 30-3000 amino acid residues and tandemly linked peptide repeats comprising 3-15 amino acid residues each. In one embodiment 6-30 wt % of the number of amino acid residues in a polypeptide are L-3,4-dihydroxyphenylalanine (DOPA). In one embodiment 2-4 wt % of the number of amino acid residues in a polypeptide are L-3,4-dihydroxyphenylalanine (DOPA). In one embodiment at least 3 wt % of the number of amino acid residues in a polypeptide are L-3,4-dihydroxyphenylalanine (DOPA). In one embodiment 10-15 wt % of the number of amino acid residues in a polypeptide are L-3,4-dihydroxyphenylalanine (DOPA). In one embodiment 20-30 wt % of the number of amino acid residues in a polypeptide are L-3,4-dihydroxyphenylalanine (DOPA). In one embodiment the polypeptide is a protein extracted from a byssus-forming mussel, such protein is called MAP (mussel adhesive protein). In one embodiment the polymer is at least one protein selected from the group consisting of MEFP-1, MEFP-2, MEFP-3, MEFP-4, and MEFP-5. The abbreviations stand for *Mytilus Edulis*, foot protein 1, 2, 3, 4, and 5 respectively. In one embodiment the polypeptide is MEFP-1.

In one embodiment the polymer a poly(alkyleneoxide) co-polymer. In one embodiment the polymer is a co-polymer of ethylene oxide and a hydrophobic co-monomer. In one embodiment said hydrophobic co-monomer is selected from the group consisting of propylene oxide, lactic acid, glycolic acid and caprolactone. In one embodiment said co-monomer comprises a hydrophobic block, and said polymeric component is a block co-polymer.

In one embodiment at least two catecholic components are conjugated to the polymer.

In one embodiment the coating comprises at least one layer comprising the at least one polymer, and wherein the coating further comprises at least one layer comprising the at least one cerium oxide. In another embodiment the coating comprises two or more layers comprising the at least one polymer, and wherein the coating further comprises at least two or more layers comprising the at least one cerium oxide.

In one embodiment the coating is at least partially applied to a metal object. In one embodiment the metal is at least one metal selected from the group consisting of iron, zinc, aluminum, and copper. In another embodiment the metal is steel. In yet another embodiment the metal is carbon steel.

Without wishing to be bound by any particular theory the inventors believe that the oxidizing ability of the MAP and ceria, can form a protective oxide (e.g., $Fe_2O_3$) on carbon steel surface beneath (or incorporated into) the composite film.

In one embodiment the coating is at least partially applied to an object comprising carbon steel.

In a second aspect there is provided a method for coating a metal object, said method comprising the step of applying at least one cerium oxide and at least one polymer, wherein the at least one polymer comprises at least one catecholic component covalently bound thereto, and wherein the at least one polymer displays a net positive charge at a pH of 7.

In one embodiment the method comprises the steps of: a) applying at least one layer comprising the at least one cerium oxide, and b) applying at least one layer comprising the at least one polymer. In one embodiment steps a) and b) are performed in one step so that the at least one cerium oxide and the at least one polymer are applied in one step. In one embodiment a layer comprising the at least one cerium oxide, and a layer comprising the at least one polymer are applied sequentially several times. It is an advantage of the invention that several layers can be made. In this way it is possible to control the layer thickness. A thicker coating comprising several layers offers a more resistant coating.

In one embodiment the application is performed using at least one method selected from the group consisting of spraying and dipping.

In one embodiment the polypeptide is oxidized during the procedure. In one embodiment the polypeptide is oxidized by addition of an oxidant. In one embodiment the polypeptide is oxidized using periodate ions. In one embodiment the polypeptide is oxidized by increasing the pH to 8 or above.

In one embodiment the polymer is cross-linked. The oxidation and cross-linking creates excellent adhesion and covalent bonds between the polymer chains and to oxides on the surface as well as to the particles comprising cerium oxide.

In a third aspect there is provided a liquid coating composition for metal objects comprising at least one cerium oxide, and at least one polymer, wherein the at least one polymer comprises at least one catecholic component covalently bound thereto, and wherein the at least one polymer displays a net positive charge at a pH of 7.

In one embodiment the at least one cathecholic component is at least one selected from DOPA (L-3,4-dihydroxyphenylalanine), and a DOPA-derivative.

The liquid coating composition is intended for coating a metal object as described above.

In a fourth aspect there is provided a kit comprising at least one cerium oxide, an instruction to coat a metal, and at least one polymer, wherein the at least one polymer comprises at least one catecholic component covalently bound thereto, and wherein the at least one polymer displays a net positive charge at a pH of 7.

In one embodiment the kit comprises a first liquid coating composition and a second liquid coating composition, wherein said first liquid coating composition comprises said at least one polymer, and wherein said second liquid coating composition comprises said at least one cerium oxide. In such an embodiment it is intended that the two coating compositions are applied sequentially in any order. The two coating compositions are in one embodiment applied sequentially several times.

In an alternative embodiment the kit comprises a liquid coating composition, wherein said liquid coating composition comprises said at least one polymer and said at least one cerium oxide. In such an embodiment it is intended that the coating composition is applied. In one embodiment the coating composition is applied several times.

In one embodiment in the above kit the at least one cathecholic component is at least one selected from DOPA (L-3,4-dihydroxyphenylalanine), and a DOPA-derivative.

In a fifth aspect there is provided a metal object coated with the coating described above.

In a sixth aspect there is provided use of at least one cerium oxide and at least one polymer, wherein the at least one polymer comprises at least one catecholic component covalently bound thereto, and wherein the at least one polymer displays a net positive charge at a pH of 7, for the prevention of corrosion of metals.

In an seventh aspect there is provided use of at least one cerium oxide and at least one polymer, wherein the at least one polymer comprises at least one catecholic component covalently bound thereto, and wherein the at least one polymer displays a net positive charge at a pH of 7, for the coating of metals.

As evidenced from the examples also the MAP protein itself provides some corrosion inhibition.

Without wishing to be bound by any scientific theories the inventors believe that the presence of L-3,4-dihydroxyphenylalanine (DOPA), is responsible for both adhesive and crosslinking characteristics as well as the hardening properties of the polymer.

EXAMPLES

Example 1

MAP (more specifically Mefp-1) used for the experiments was supplied by Biopolymer Products AB (Gothenburg, Sweden). The MAP was delivered in 0.2 M H3PO4 solution at a concentration of 18.7 mg/ml. The solution was stored at 4° C.

The ceria (cerium oxide) nanoparticles (NANOBYK-3810) were supplied by BYK Company, Germany. The diameter of the ceria particles is 10 nanometers with a narrow size distribution according to the supplier. The particles are dispersed in water and stored at room temperature before use. All chemicals used for preparing solutions were of analytical grade and the water was of high purity. The solutions were sonicated for 10 minutes before the experiment to ensure good dispersion of nanoparticles.

The carbon steel used as substrate was cold rolled low carbon steel (DC 01, 1.0330), supplied by IVF, Sweden. The steel sheet samples were wet ground with SiC grinding paper successively to 1200 grids, and then cleaned ultrasonically with ethanol. For the AFM measurements, the sample surface was first ground using SiC grinding paper in several steps down to 2400 grits, and then a final polishing procedure was performed by using a suspension of 0.02 ?m alumina particles. Afterward the sample was cleaned ultrasonically with ethanol and dried with a gentle stream of nitrogen gas.

For the study of morphology of the MAP and ceria composite film, silica was also used as an inert model substrate. Thermally oxidized silicon wafers were purchased from Wafer Net, Germany. The wafers were cut to required size (1 cm×1 cm). Prior to the experiment, the silica surface was ultrasonically cleaned with ethanol and dried with a stream of nitrogen gas.

The QCM instrument used was a q-sense E4 microbalance (q-sense, Gothenburg). It was employed to follow the film formation process on quartz crystal coated with a thin stainless steel-like layer (q-sense, Gothenburg). The composition analysis of the coated surface layer reveals a high content of Cr and oxygen, indicating an oxidized Cr surface, which was sufficiently inert to provide a stable baseline during the measurement.

MAP and ceria solutions were prepared for the deposition of the composite film: 100 ppm MAP in 1% citric acid with 50 mM NaCl at pH 6, and 500 ppm ceria nanoparticles dispersed in water with 50 mM NaCl. The substrate sample was firstly immersed for 1 hour in the MAP solution and then 40 minutes in the nano-ceria solution, respectively, and this procedure was repeated 4 times to deposit the composite film of the sample surface. The immersion procedures were carried out at room temperature and the solutions were renewed between each step. After all the deposition procedures, the sample was gently rinsed in pure water and dried. The sample was kept in air at room temperature overnight before the corrosion test.

A QCM-D instrument, which is a highly sensitive balance based on the measurement of changes in the resonance frequency of a quartz crystal oscillator, was used to study the film formation process. Adsorption (or desorption) of the material to the crystal surface will give rise to a frequency change, which is measured and used to calculate the adsorbed amount according to the linear relationship described by the Sauerbrey equation (assuming a rigid adsorbed layer).

$$\Delta m = \frac{\Delta f \times C}{n}$$

where $\Delta f$ is the measured frequency change due to adsorption, C is the mass sensitivity constant of the quartz crystal, 17.7 mg*m$^{-2}$*Hz$^{-1}$ for the 5 MHz resonance frequency, and n is the overtone number (n=1, 3, 5 . . .). This formula was used for evaluating the experimental data.

The QCM-D also gives information about shear viscoelastic properties of the film by measuring the energy dissipation (D). This parameter is obtained from the rate of decay of the crystal oscillation when the voltage is switched off. For a soft film the decay time is small, and the dissipation value is high, whereas for a rigid film the dissipation value is smaller.

An optical microscope was used to inspect a large surface area. Moreover, a Nanoscope Multimode AFM was used to image the detailed morphology of the composite films deposited on the carbon steel surface and the silica surface. The probe was a phosphorus doped n-type silicon tip with a spring constant of 5.7 N/m and resonant frequency of 160 kHz. All images were taken in tapping mode with a scan rate of 1 Hz, and were flattened to remove the slope due to sample tilting. The optical and AFM imaging were done in air, ex-situ, on dried samples.

AFM imaging by tapping mode yields both a topography image (height) and a phase image. The phase image is influenced by variations in surface composition, adhesion, friction, viscoelasticity, etc. Phase images obtained simultaneously with height images give additional information of the microstructure.

The electrochemical measurements were performed for samples exposed to 0.1 M NaCl solution with 0.2 M H3PO4, and the pH was adjusted to 4.6 using a NaOH solution. EIS measurements were performed to determine the polarization resistance, a measure of corrosion resistance, for samples coated with the composite film, and for the control sample without any film. For comparison, the carbon steel sample exposed to the same solution with 100 ppm MAP as corrosion inhibitor was also included in this study. The EIS measurements were carried out at the open-circuit potential after 1 hour, 1, 3 and 7 days of exposure with perturbation amplitude of 10 mV and over the frequency range from 104 Hz to 10-2 Hz.

Upon termination of the exposure, potentiodynamic polarization was performed to further evaluate the corrosion protection properties of the composite film. The potential sweep was started at −0.2 V vs. open-circuit potential, and terminated at an anodic potential at which the current density reached 1 mA/cm². The sweep rate was 10 mV/min.

For monitoring the film formation process, the "stainless steel" covered QCM crystals were alternately immersed in 100 ppm MAP (positively charged) and 500 ppm ceria nanoparticle (negatively charged) solutions containing 1 wt % citric acid at pH 6 and 50 mM NaCl. After each deposition immersion the excess of material as well as the NaCl were removed by rinsing with water. The adsorption experiments were done using a continuous flow with a flow rate 100 microL/min and at a temperature of 23° C. Before the experiment the base line in the buffer solution was established.

The growth of the composite film was followed by the mass change as a function of deposition number as shown in FIG. 1. Filled symbols correspond to the sensed mass (the mass sensed by the QCM is due to both the deposited material and that of hydrodynamically coupled water) during the adsorption step, and open symbols to that obtained after rinsing with water. The data demonstrate a linear increase of the mass with the layer number. The results suggest a continuous build-up of the composite film by increasing number of immersion steps, and the ceria nanoparticles are irreversibly (with respect to dilution) incorporated into the composite film.

Figure 2:
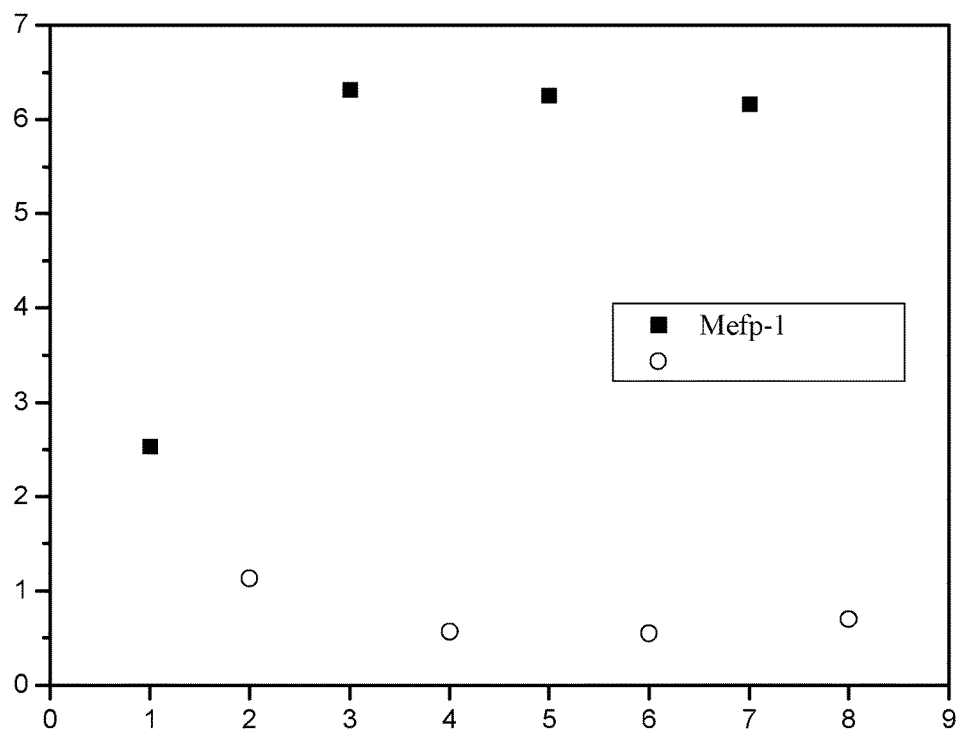
FIG. 2 shows the change in energy dissipation as a function of deposition number during alternative adsorption of Mefp-1 (filled squares) and ceria nanoparticles (empty circles).

The change in energy dissipation as a function of deposition number for MAP and ceria nanoparticle deposition is shown in FIG. 2. The high dissipation values obtained after MAP adsorption (odd layer numbers) demonstrate that MAP is adsorbed in extended conformations that allow significant hydrodynamic coupling to the solvent. In contrast, the low values obtained after ceria nanoparticle adsorption (even layer numbers) demonstrate formation of a more rigid layer.

Figure 3A:
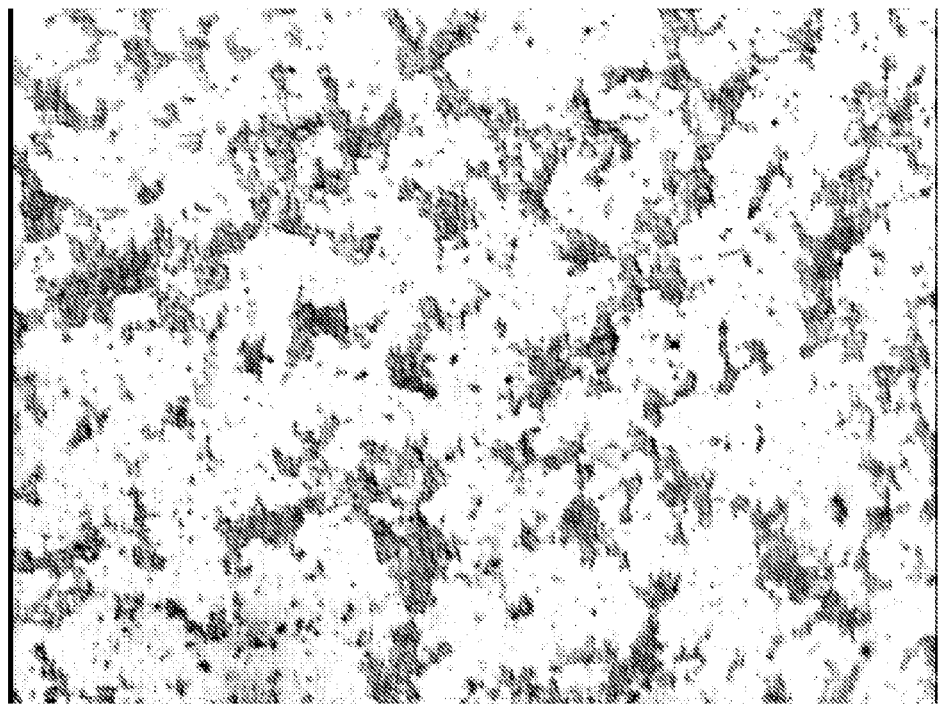
FIGS. 3a and b show optical microscope images of 500 times magnification for the MAP and ceria nanoparticle composite films (4 adsorption steps for MAP and 4 for ceria nanoparticles), (A) on carbon steel, and (B) on silica.
Figure 3B:
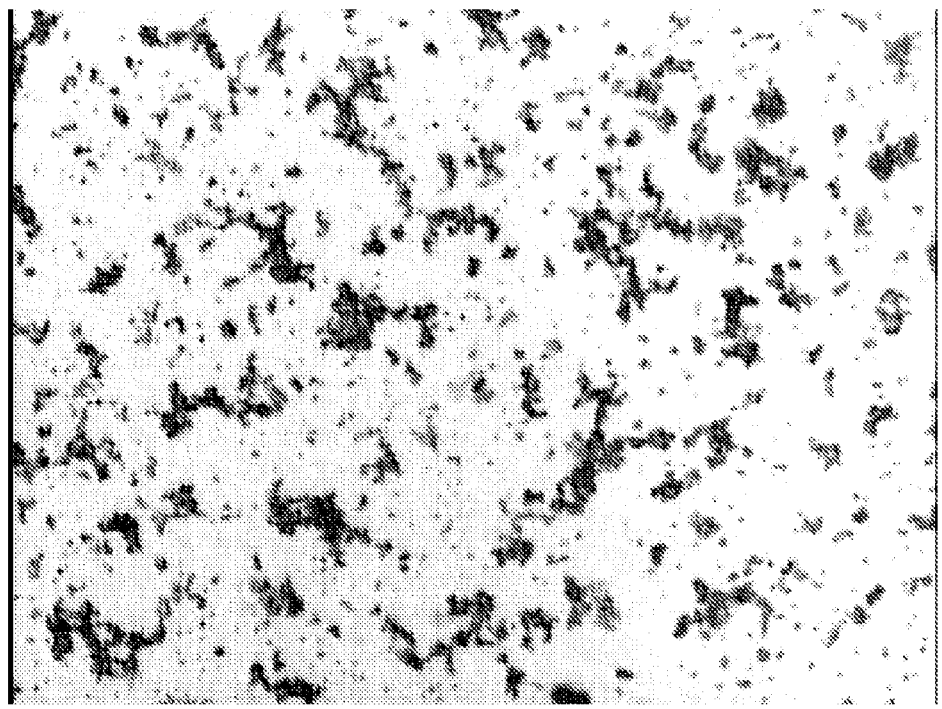

FIG. 3 shows examples of optical images at 500 times magnification of the MAP and ceria nanoparticle composite films deposited on the carbon steel and on silica, respectively. It can be seen that the morphology of the MAP and ceria nanoparticle composite films are similar on both surfaces. The films are not uniform, and there are microdomains extending from and randomly distributed in the compact and smooth surface layer. The compact and smooth parts of the film consist of nanostructures as revealed by AFM (below). It appears that the MAP and ceria that are present in the composite film do not form separate layers, but rather MAP binds the ceria nanoparticles and together form a fractal-like structure consisting of extending domains and compact domains.

Figure 4A:
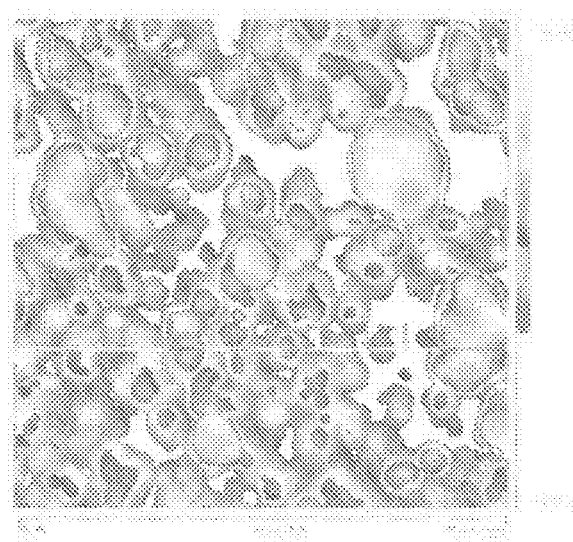
FIG. 4a shows a tapping mode AFM topography image of a compact part of the composite film on silica.
Figure 4B:
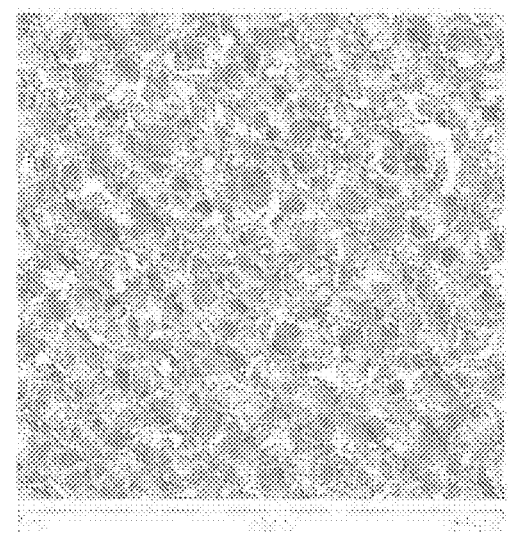
FIG. 4b shows a corresponding phase image, showing a densely packed uniform nanostructure of the film.
Figure 4C:
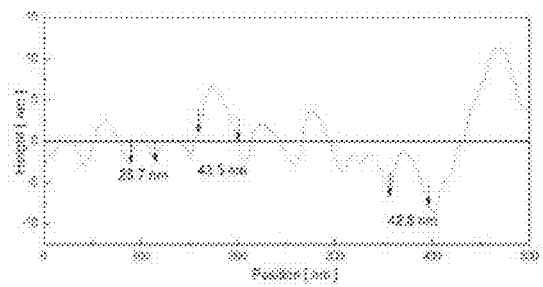
FIG. 4c shows a single line height profile showing nano-sized particles.

An example of topography and phase images, obtained by tapping mode, of the compact part of the composite film on a silica surface, as well as a single line height profile are shown in FIG. 4. The topography image and the line height profile clearly show nano-sized particles. Although many particles appear to have a size of about 20-40 nm, the smallest particles have a spherical shape and a size of ca. 10 nm, which is the size of the ceria nanoparticles used. The larger particles could be aggregates of the ceria nanoparticles glued together by MAP. The corresponding phase image indicates a densely packed uniform nanostructure of the film.

The MAP and ceria nanoparticle composite film in this study is significantly more compact than the adsorbed MAP film formed in another study from a solution with 1 mg/ml (10 times higher than used in this work) at pH 4.6 on silica. Without wishing to be bound by any particular scientific theory the inventors speculate that highly charged cations an in particular ceria ($Ce^{3+}$) may promote the adsorption of MAP.

Figure 5A:
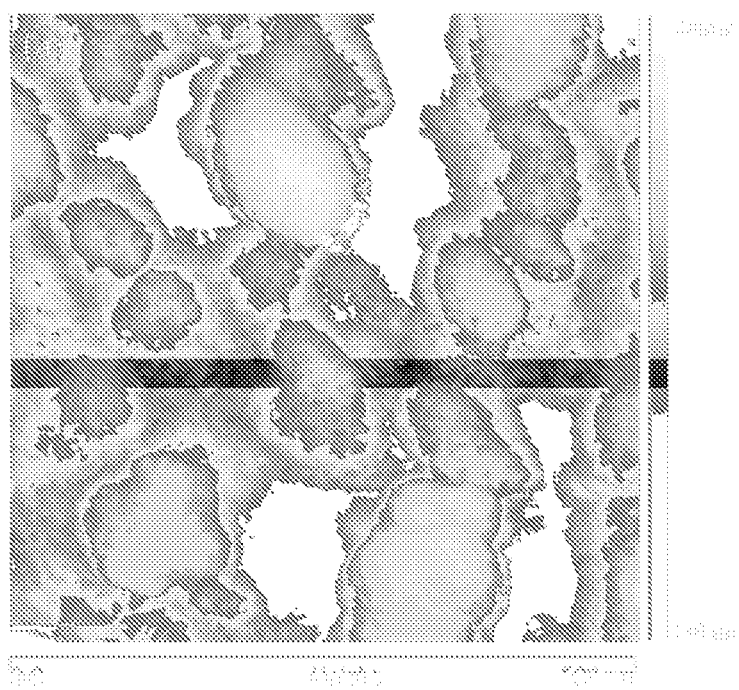
FIGS. 5a and b show a tapping mode AFM topography image of the compact part of the composite film on carbon steel surface. (b) Corresponding phase image, showing two distinct phases in the composition.
Figure 5B:
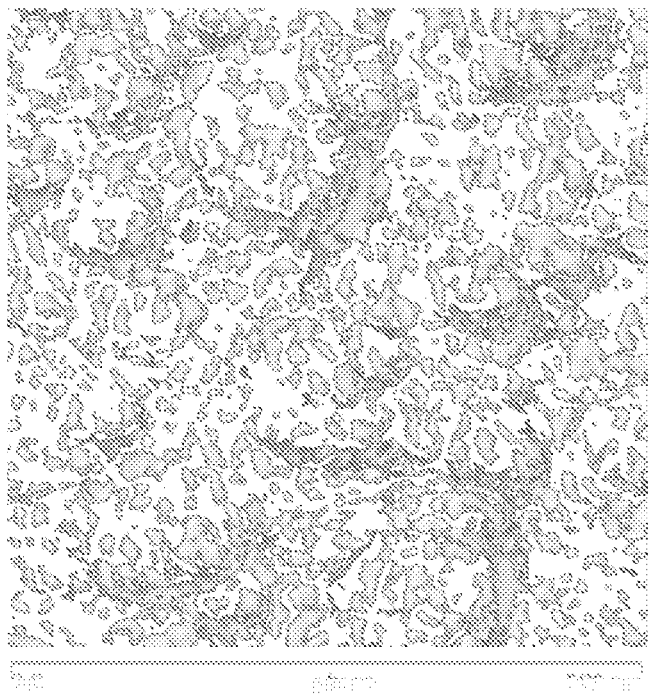
Figure 6A:
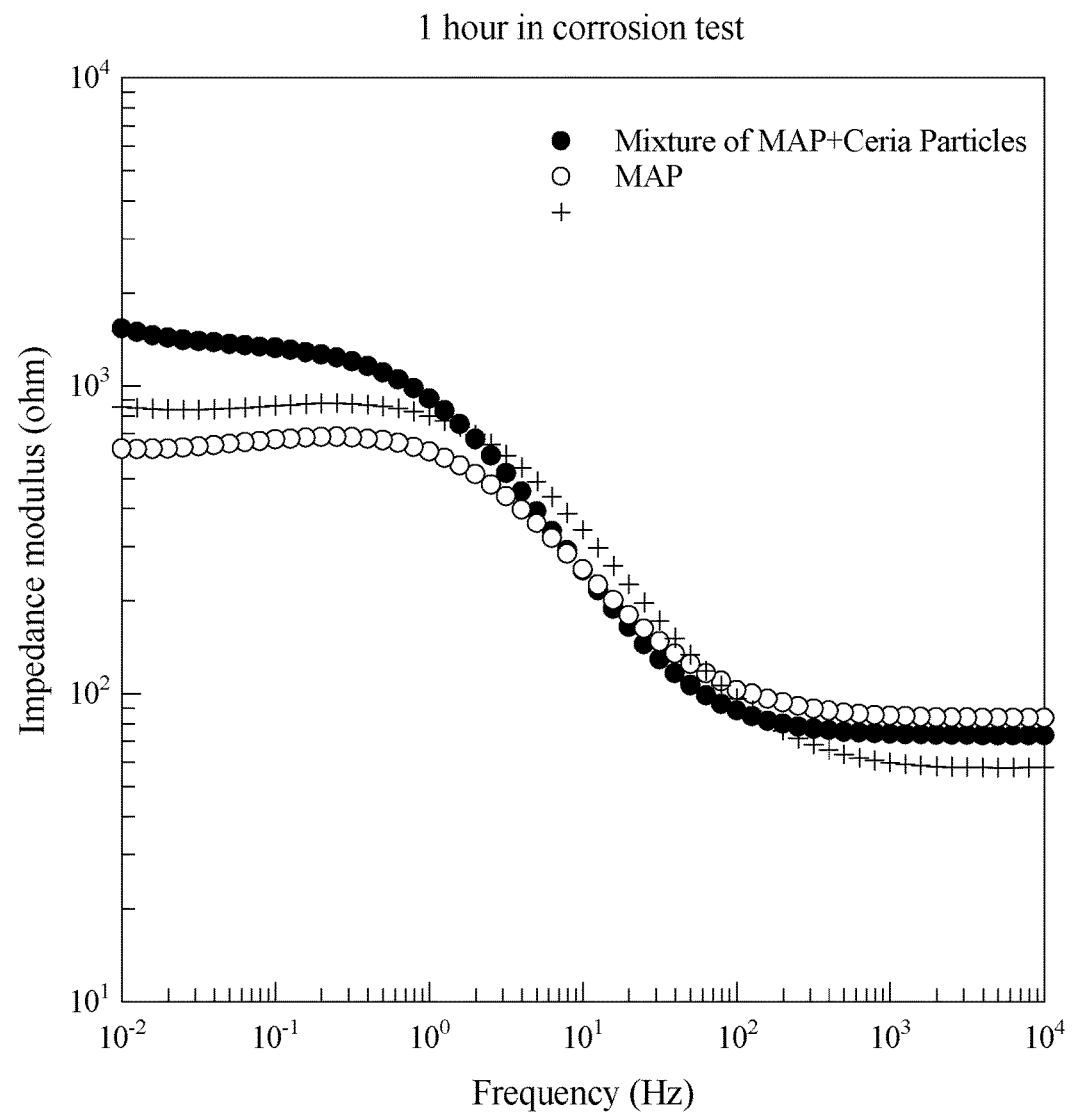
FIGS. 6a, b, c, and d shows Bode plots for a sample with a composite film consisting of 4 alternating MAP/ceria layers, as compared to carbon steel control sample and the sample with MAP in the solution after different periods of exposure time, 1 hour (FIG. 6a), 1 day (FIG. 6b), 3 days (FIGS. 6c), and 7 days (FIG. 6d).
Figure 6B:
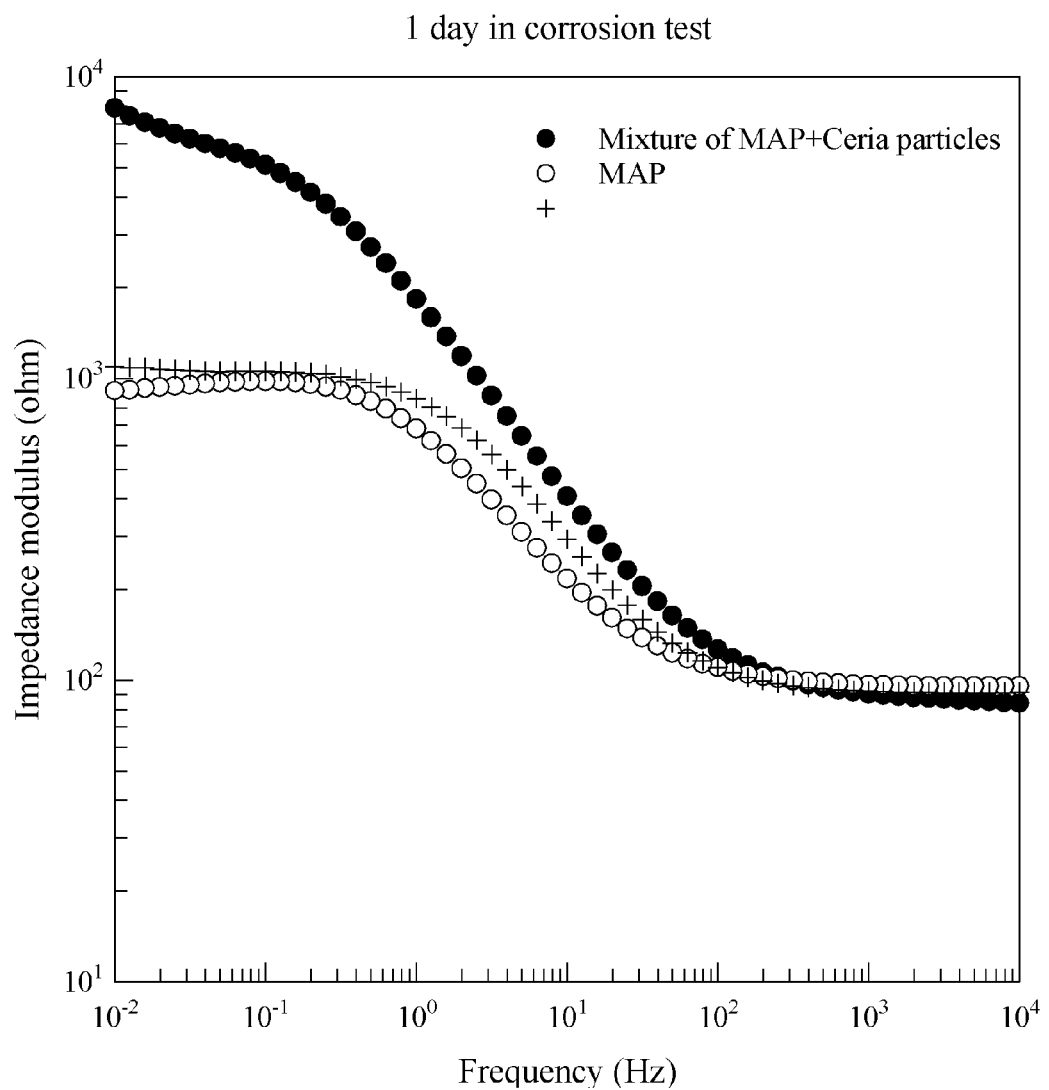
Figure 6C:
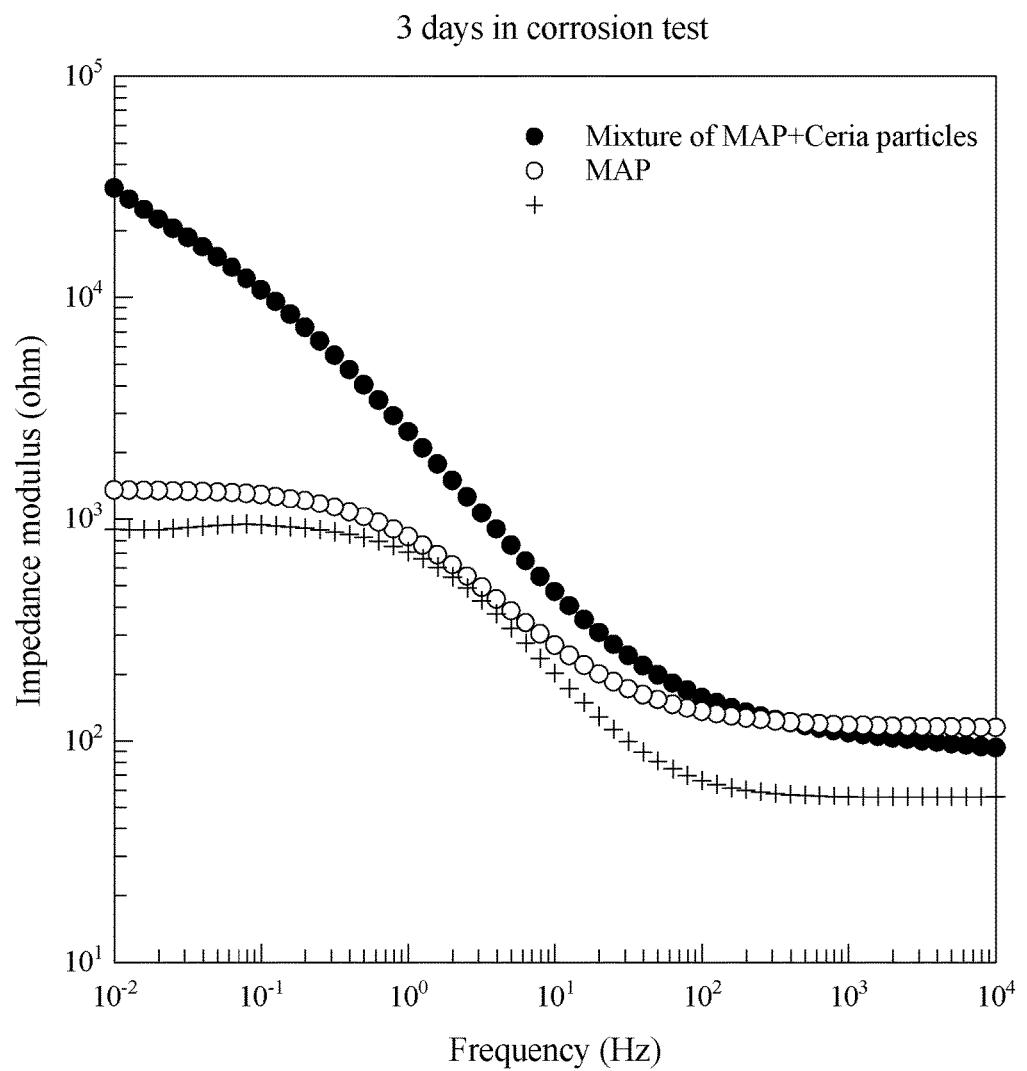
Figure 6D:
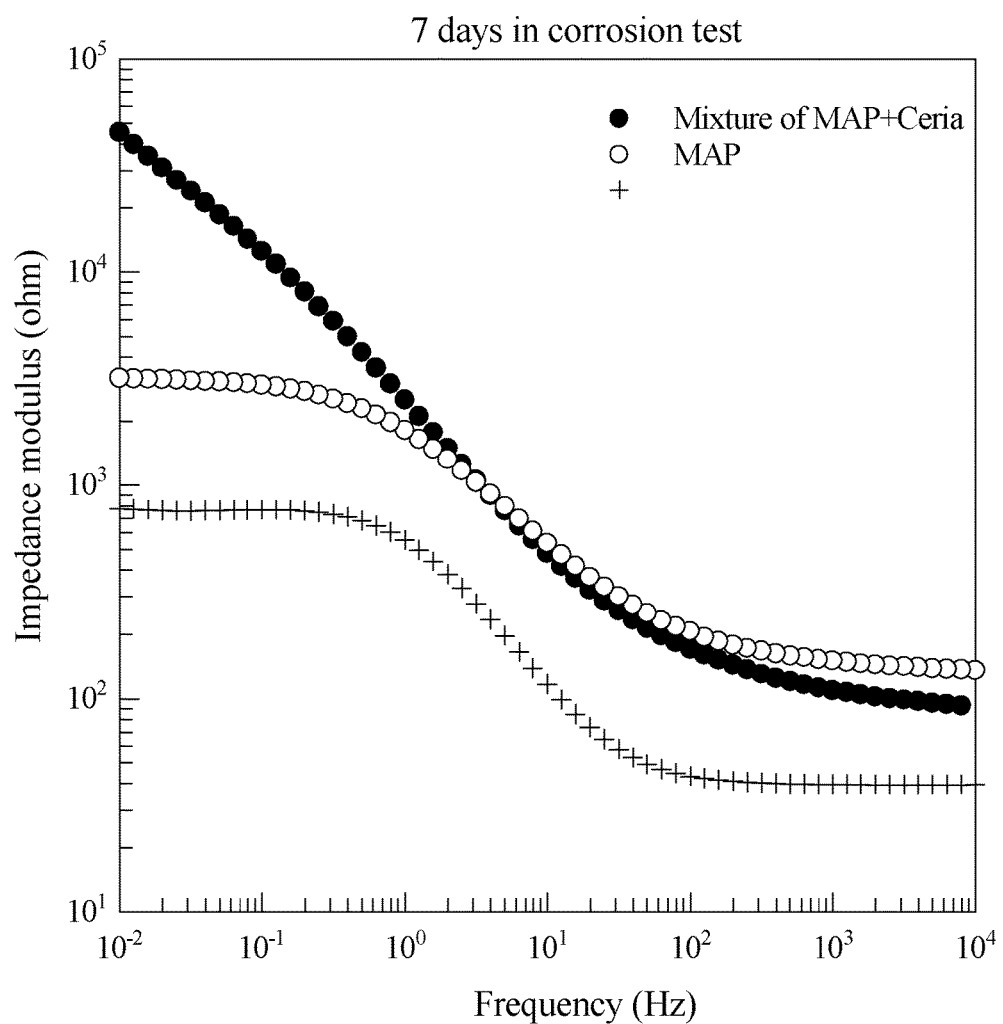

FIG. 5 shows an example of topography and phase images, obtained by tapping mode, of the compact part of the composite film on carbon steel surface. The detailed nanostructure of the composite film on carbon steel is different from that on silica (FIG. 4). The carbon steel surface was fully covered by aggregates with a size about 100 nm, which is significantly larger than the ones formed on the silica surface. Moreover, as revealed in the phase image, each large aggregate consists of two different phases, indicating different properties of the components of the aggregates. It can be expected that the hard ceria nanoparticles and soft MAP components provide the contrast in the phase image. Although it is not possible to ascertain the harder or softer components by the phase image, the inventors speculate that the lighter phase may be ceria nanoparticles as judged by their small size of about 10 nm, the darker phase is probably associated with MAP or MAP-metal complexes. A densely packed MAP and ceria nanoparticle composite film fully covering the surface should give a high corrosion protection for carbon steel, which indeed is verified in the electrochemical measurements (next section).

Without wishing to be bound by any particular scientific theory the inventores speculate that, based on the AFM observation, it may be suggested that, on the carbon steel surface where Fe ions are released, complexation of MAP and metal ions takes place and this results in formation of large aggregates consisting of ceria nanoparticles and MAP-metal complexes.

Typical EIS spectra in Bode form obtained after 1 hour, 1, 3 and 7 days of exposure to 0.1 M NaCl solution with 0.2 M $H_3PO_4$ at pH 4.6 are displayed in FIG. 6. The results obtained for carbon steel with the MAP and ceria nanoparticle composite film are compared to those for bare carbon steel (control), and carbon steel with 100 ppm MAP added into the solution. The impedance modulus at the low frequency limit gives an indication of the level of the polarization resistance. A higher polarization resistance implies a higher corrosion resistance.

The results show clearly that the MAP and ceria composite film leads to a significantly increased corrosion resistance, already during the initial period of exposure (1 hour). This protection effect is greatly enhanced after 1 day's exposure, it continues to increase after 3 day's exposure, and approaches a high level after 1 week's exposure. In contrast, MAP added to the solution provides pronounced inhibition effect only after 1 week's exposure. The corrosion resistance of the composite film is more than one order of magnitude higher than that given by the MAP inhibitor alone, clearly displaying the synergistic effect.

Figure 7:
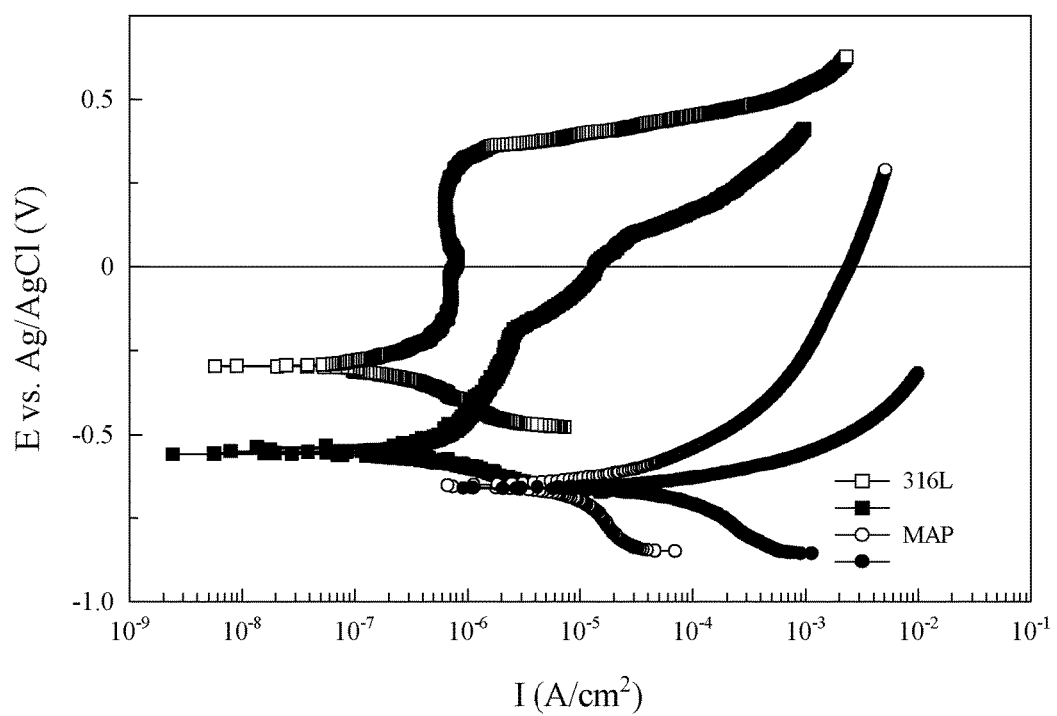
FIG. 7 shows polarization curves obtained after 7 days of exposure in 0.1 M NaCl solution with 0.2 M $H_3PO_4$ at pH 4.6, for carbon steel without protection (control), with 100 ppm MAP added as inhibitor (MAP), with the MAP and ceria composite film (MAP+ceria). The curve for stainless steel 316L obtained immediately after immersion is included for comparison.

The polarization curves obtained after termination of the 1-week exposure are displayed in FIG. 7. The polarization curve of a stainless steel (316L) is also included in the figure for comparison. Analysis of the polarization curve for the composite film gives a corrosion current density of the order of $\mu A/cm^2$, and the curve exhibits a small potential range of passivity. The results demonstrate that the MAP and ceria nanoparticle composite film can provide an excellent corrosion protection to carbon steel, which is almost comparable with that of stainless steel.

By curve fitting of the small potential range around the corrosion potential (activation control) of the polarization curves using the CorrView software, the corrosion current was obtained for these samples and the data are shown in Table 1. It can be seen that the corrosion current decreased ca. 7 times by the MAP inhibitor and ca. 70 times by the MAP and ceria nanoparticle composite film, further illustrating the synergistic effect. The current density of the composite film is around 1 μA/cm2, which in practice is often regarded as the level of passivity of alloys like stainless steels.

TABLE 1

Corrosion potential and current density obtained from the polarization curves.

| Material | $E_{corr}$ (mV vs. Ag/AgCl) | $I_{corr}$ (μA/cm$^{-2}$) |
|---|---|---|
| 316L | −290 | 0.24 |
| MAP + Ceria | −600 ± 30 | 0.86 ± 0.40 |
| MAP | −654 ± 2 | 7.90 ± 1.00 |
| Control | −647 ± 18 | 58.91 ± 6.84 |

Example 2

Pure Zn was used as the substrate metal. The same pure MAP and ceria nanoparticles were used as those used in example 1.

Zn sample surfaces were wet ground successively with sandpaper of 500, 800, 1200 grits, after cleaning, the samples were left overnight in a closed container. The deposition of the composite film was carried out on the next day.

Fresh MAP solution was prepared 2 min before the immersion. For the film deposition, the MAP solution contains 0.1 mg/mL MAP, 1% citric acid and 50 mM NaCl, and the pH was 6. The ceria solution contains 500 ppm ceria nanoparticles dispersed in water, and 50 mM NaCl. The film deposition procedure was the same as usual: 1 hour immersion in the MAP solution and 40 min in the ceria solution, without rinsing with water in between. The film deposition was performed by alternating immersion in the MAP solution and ceria solution for 4 times.

It was noted that, at the beginning of second immersion in the MAP solution, some reaction product was observed as a grayish layer floating at the surface of the MAP solution. The floating product started to appear on the MAP solution after the first deposition of ceria, and it was observed at all further steps for film deposition in the MAP solution.

The Zn samples with the deposited MAP and ceria nanoparticle composite film were exposed to 0.1 M NaCl solution with 0.2 M $H_3PO_4$ at pH 4.6, the open circuit potential (OCP) was recorded continuously for 15 minutes, and then EIS was performed after, 1 hour, 1, 3 and 7 days of exposure, as for the carbon steel samples (example 1).

The results from 3 parallel measurements show a good reproducibility, so only the results from one set of samples are presented in this report.

Figure 8:
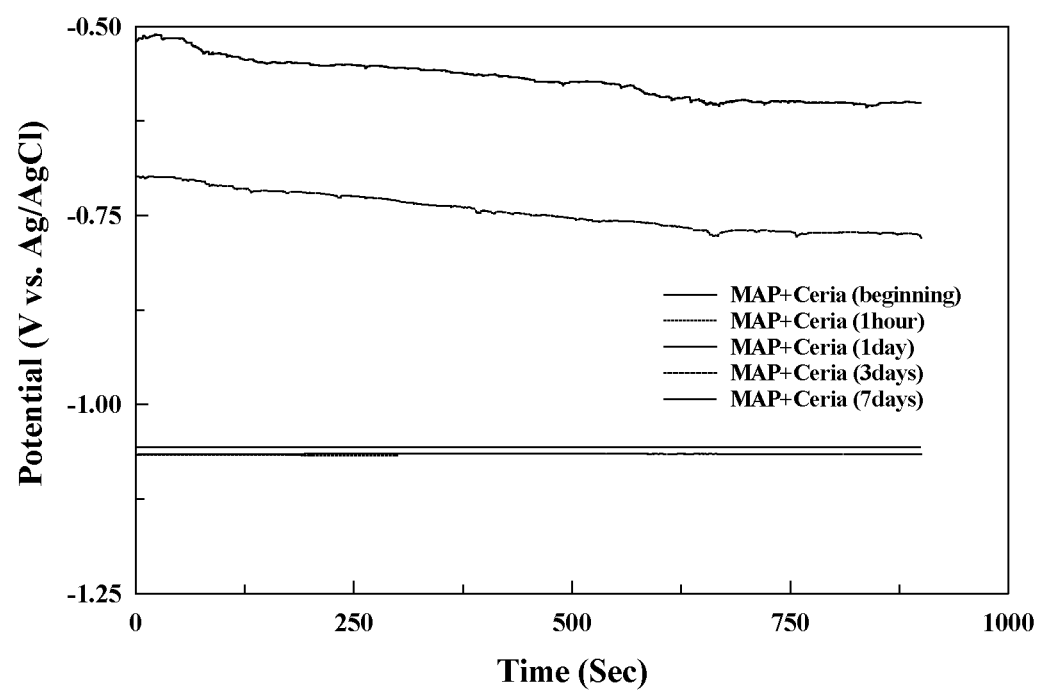
FIG. 8 shows OCP vs. time for Zn sample with the MAP and ceria composite film in 0.1 M NaCl solution with 0.2 M $H_3PO_4$ at pH 4.6, in the beginning, after 1 hour, 1, 3 and 7 days of exposure.

FIG. 8 shows the OCP vs. time for the Zn sample with the MAP and ceria composite film in the beginning, after 1 hour, 1, 3 and 7 days of exposure. In the beginning, the OCP of the sample was at ca. −1.1 V vs. Ag/AgCl, which is similar to Zn without any surface film. This indicates that the MAP and ceria composite film is permeable to the electrolyte. The OCP slightly increased after 1 day, indicating some change has occurred in the surface film. It follows that the OCP increased significantly with time, reaching ca. −0.7 V after 3 days and −0.6 V after 7 days. It is clear that, during the exposure, some interactions take place in the composite films and/or between the film and Zn corrosion products, which lead to a pronounced ennoblement of the Zn surface. Consequently, this resulted in an enhanced corrosion protection of Zn in the solution, as confirmed by the EIS measurements.

Figure 9:
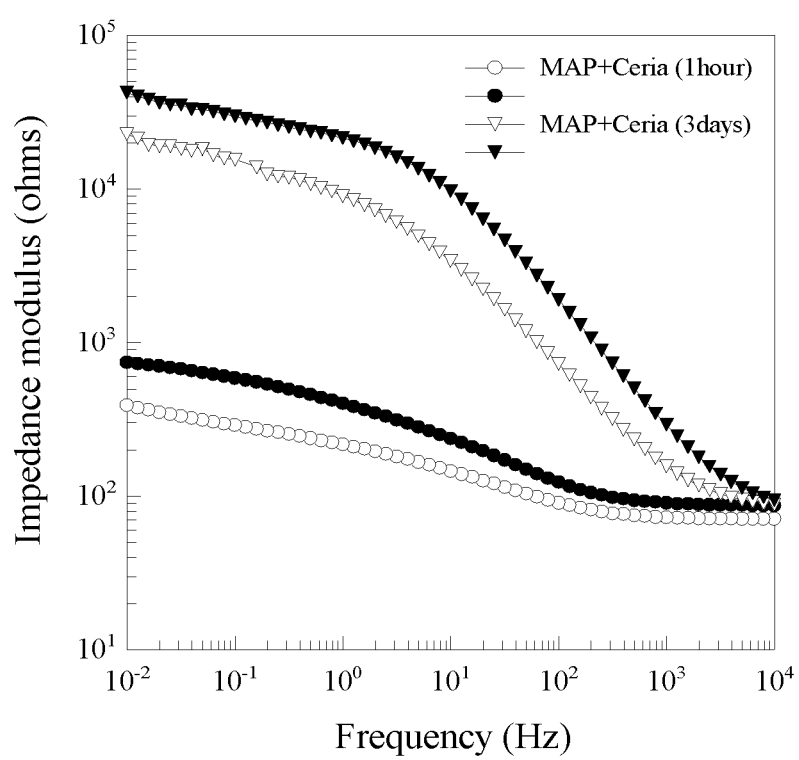
FIG. 9 shows Bode plots of Zn sample with the MAP and ceria composite film in 0.1 M NaCl solution with 0.2 M $H_3PO_4$ at pH 4.6, after 1 hour, 1, 3 and 7 days of exposure.
Figure 10A:
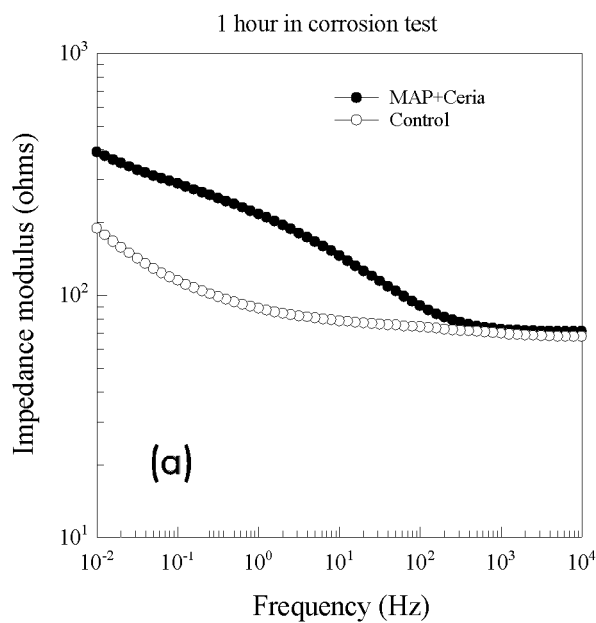
FIG. 10a-d show Bode plots of Zn sample with the MAP and ceria composite film and the control sample (no film) in 0.1 M NaCl solution with 0.2 M $H_3PO_4$ at pH 4.6, after (a) 1 hour, (b) 1 day, (c) 3 days, and (d) 7 days of exposure.
Figure 10B:
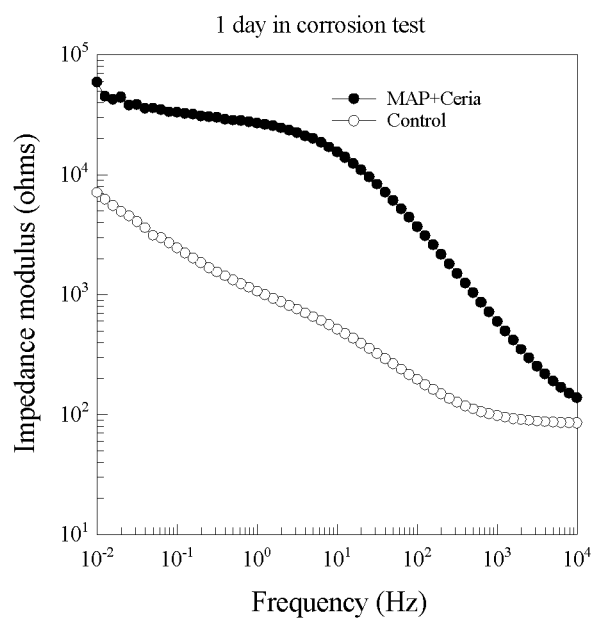
Figure 10C:
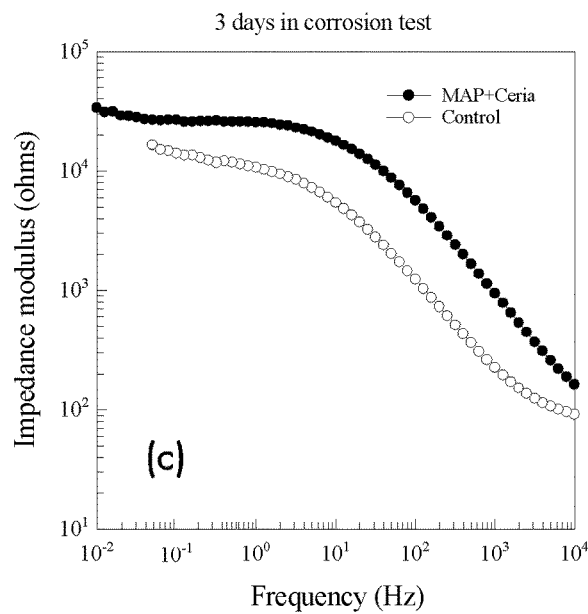
Figure 10D:
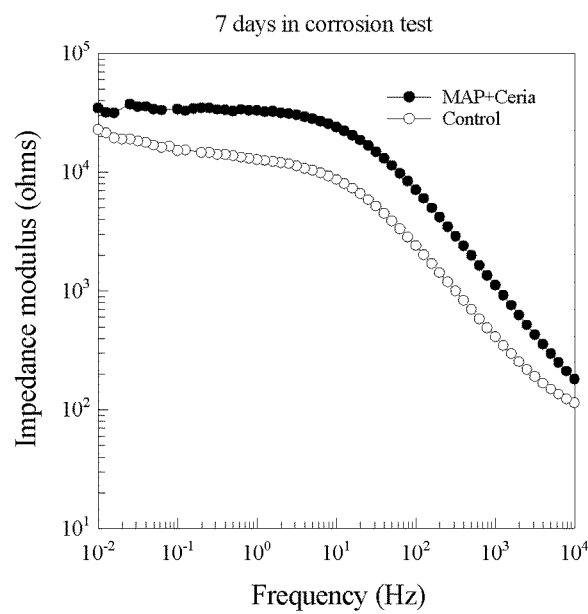

FIG. 9 shows typical Bode plots of the EIS spectra obtained for the Zn sample with the MAP and ceria composite film after 1 hour, 1, 3 and 7 days of exposure. As can be seen from the EIS spectra, with a prolonged exposure, the sample increasingly exhibits capacitive behavior, and the impedance at low frequency end (a measure of corrosion resistance) increased about two orders of magnitudes. The results suggest a great enhancement in the corrosion resistance of the sample, which implies that the surface layer (composite film and corrosion products) becomes more protective with the exposure.

It should be mentioned that, Zn is an active metal, usually in acidic solutions or NaCl solutions it will corrode fast because no stable corrosion products will form on the surface, and the OCP remains at the low level due to the dominating electrochemical corrosion reaction of Zn. Based on the results above, it can be concluded that the MAP and ceria composite film has a protection mechanism for zinc substrate in the solution.

The figures (FIG. 10a-10d) show comparison between the EIS results from the Zn sample with the MAP and ceria composite film and those from the control sample without any film. Apparently the corrosion resistance of the control sample also increased with exposure in this solution. The inventors speculate that this could be a result of interaction between Zn and phosphoric acid present in the solution, similar to a phosphate treatment.

The invention claimed is:

1. A kit for providing a coating for preventing corrosion of metal objects, said kit comprising (i) a liquid coating composition comprising water, at least one cerium oxide in the form of particles with a diameter of 1-1000 nm, and at least one polymer comprising at least one polypeptide extracted from a byssus-forming mussel, wherein the at least one polymer comprises at least one catecholic component covalently bound thereto, and wherein the at least one polymer displays a net positive charge at a pH of 7, or said kit comprising (ii) a first composition (a) comprising water and the at least one cerium oxide particles, and a second composition (b) comprising water and the at least one polymer.

2. The kit according to claim 1, wherein the at least one cerium oxide is $CeO_2$.

3. The kit according to claim 1, wherein the at least one cathecholic component is DOPA (L-3,4-dihydroxyphenylalanine).

4. The kit according to claim 1, wherein the at least one polymer comprises at least 2 wt % based on the molecular weight Mw of at least one moiety selected from DOPA (L-3,4-dihydroxyphenylalanine) and a DOPA-derivative.

5. The kit according to claim 1, wherein 6-30 wt % of the polymer based on the molecular weight Mw is at least one moiety selected from DOPA (L-3,4-dihydroxyphenylalanine) and a DOPA-derivative.

6. The kit according to claim 1, wherein the at least one polymer is a polypeptide comprising 30-3000 amino acid residues and tandemly linked peptide repeats comprising 3-15 amino acid residues each.

7. The kit according to claim 1, wherein the at least one polymer is a mussel adhesive protein.

8. The kit according to claim 1, wherein the polymer is at least one protein selected from the group consisting of MEFP-1, MEFP-2, MEFP-3, MEFP-4, and MEFP-5.

9. The kit according to claim 1, wherein the polymer is oxidized.

10. The kit according to claim 1, wherein the at least one cathecholic component is at least one selected from DOPA (L-3,4-dihydroxyphenylalanine) and a DOPA-derivative.

11. The kit according to claim 1, further comprising dihydrogen phosphate ion.

12. The kit according to claim 1, wherein the kit comprises the liquid coating composition (i).

13. The kit liquid coating composition according to claim 1, wherein the kit comprises (ii) the first composition (a) and the second composition (b).

14. The kit according to claim 1, wherein corrosion inhibitors in the kit consist of the cerium oxide and the polymer.

15. An object coated with at least two coating layers formed from the kit according to claim 1.

16. The object according to claim 15, wherein the object comprises carbon steel.

17. The object according to claim 15, wherein the coating layers comprise aggregates of the cerium oxide and the polymer.

\* \* \* \* \*